(12) United States Patent
Qi (10) Patent No.: US 12,238,019 B2
(45) Date of Patent: Feb. 25, 2025

(54) METHOD AND APPARATUS FOR INTER COMMUNICATION DEVICE MEASUREMENT AND TIMING ADVANCE IN A COMMUNICATION SYSTEM

(71) Applicant: Samsung Electronics Co., Ltd., Suwon-si (KR)

(72) Inventor: Yinan Qi, Staines (GB)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/393,281

(22) Filed: Dec. 21, 2023

(65) Prior Publication Data

US 2024/0129077 A1 Apr. 18, 2024

Related U.S. Application Data

(63) Continuation of application No. 17/430,694, filed as application No. PCT/KR2020/002235 on Feb. 17, 2020, now Pat. No. 11,855,916.

(30) Foreign Application Priority Data

Feb. 15, 2019 (GB) ...................... 1902151
Jan. 31, 2020 (GB) ...................... 2001337

(51) Int. Cl.
 *H04L 5/00* (2006.01)
 *H04B 17/345* (2015.01)
(52) U.S. Cl.
 CPC .......... *H04L 5/0032* (2013.01); *H04L 5/0051* (2013.01); *H04L 5/0073* (2013.01)

(58) Field of Classification Search
 CPC .. H04W 17/318; H04W 17/345; H04W 17/24
 See application file for complete search history.

(56) References Cited

U.S. PATENT DOCUMENTS

| 2018/0338256 | A1 | 11/2018 | Fodor et al. |
| 2018/0367346 | A1 | 12/2018 | Chen et al. |
| 2019/0081835 | A1* | 3/2019 | Yang ............ H04B 17/12 |
| 2019/0260486 | A1 | 8/2019 | Kang et al. |

FOREIGN PATENT DOCUMENTS

| WO | 2018126792 A1 | 7/2018 | |
| WO | WO-2019032779 A1 * | 2/2019 | ........... H04L 5/0048 |

OTHER PUBLICATIONS

RAN1, "LS on UE-UE CLI measurement and reporting", 3GPP TSG RAN WG1 Ad-Hoc Meeting 1901, Jan. 21-25, 2019, R1-1901405, 2 pages.

(Continued)

*Primary Examiner* — Kevin Kim (57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

16 Claims, 7 Drawing Sheets

(56) References Cited

OTHER PUBLICATIONS

CMCC, "Discussion on backhaul information exchange for CLI management", 3GPP TSG-RAN WG1 AH 1901, Jan. 21-25, 2019, R1-1900409, 4 pages.
Supplementary European Search Report dated Oct. 21, 2022 in connection with European Patent Application No. 20 75 4907, 14 pages.
ZTE, "Discussion on UE-to-UE measurement and reporting for CLI mitigation", 3GPP TSG RAN WG1 Ad-Hoc Meeting 1901, Jan. 21-25, 2019, R1-1900221, 7 pages.
ZTE, "Discussion on Measurements and RS Design for CLI Mitigation", 3GPP TSG RAN WG1 Meeting #89, May 15-19, 2017, R1-1707204, 9 pages.
Qualcomm Incorporated, "Network coordination and gNB information exchange for CLI", 3GPP TSG RAN WG1 AdHoc Meeting 1901, Jan. 21-25, 2019, R1-1900893, 2 pages.
Samsung, "Timing alignment on cross-link for dynamic TDD", 3GPP TSG RAN WG1 Meeting NR#3, Sep. 18-21, 2017, R1-1716037, 6 pages.
ZTE et al., "Discussion on Measurement and RS Design for CLI Mitigation", 3GPP TSG RAN WG1 AH_NR#1 Meeting, Jan. 16-20, 2017, R1-1700271, 8 pages.
Huawei et al., "Timing alignment on cross-link", 3GPP TSG RAN WG1 Meeting 91, Nov. 27-Dec. 1, 2017, R1-1719836, 6 pages.
International Search Report dated May 21, 2020 in connection with International Patent Application No. PCT/KR2020/002235, 3 pages.
Written Opinion of the International Searching Authority dated May 21, 2020 in connection with International Patent Application No. PCT/KR2020/002235, 6 pages.
Combined Search and Examination Report under Sections 17 18(3) dated Jun. 30, 2020 in connection with United Kingdom Patent Application No. GB2001337.1, 10 pages.

\* cited by examiner

METHOD AND APPARATUS FOR INTER COMMUNICATION DEVICE MEASUREMENT AND TIMING ADVANCE IN A COMMUNICATION SYSTEM

CROSS-REFERENCE TO RELATED APPLICATIONS

This application is a continuation application of application Ser. No. 17/430,694 filed on Aug. 12, 2021, which is a 371 of International Application No. PCT/KR2020/002235 filed on Feb. 17, 2020, which claims priority to United Kingdom Patent Application No. 1902151.8 filed on Feb. 15, 2019, and United Kingdom Patent Application No. 2001337.1 filed on Jan. 31, 2020, the disclosures of which are herein incorporated by reference in their entirety.

BACKGROUND

1. Field

The field of this invention relates generally to implementing inter-communication device measurement and timing advance in a wireless communication system. The invention is applicable to, but not limited to, inter wireless communication device measurements between user equipment and/ or between inter-nodes, and such nodes can be TRPs, gNBs and integrated access and backhaul (IAB) nodes.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FOAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The present invention has been made to address at least the above problems and/or disadvantages and to provide at least the advantages described below. Accordingly, an aspect of the present invention provides a method and apparatus for inter communication device measurement and timing advance in a communication system.

Communication systems can be configured for both time division duplex (TDD) operation and frequency division duplex (FDD) operation. In both TDD and FDD systems, there is always co-channel interference that needs to be taken into account. For DL communications, a UE receives interfering signals from the base stations in neighboring cells, whilst receiving a DL transmission from its serving cell. The neighboring cell interference impairs the reception of the desired DL signals from the serving cell. For UL communications, a serving base station experiences interference from Ues transmitting on the UL in neighboring cells.

DL-to-UL interference, referred to herein as cross-link interference (CLI), occurs when one base station, referred to herein as a base station to which the aggressor UE is associated, is transmitting on the DL, while a second base station, referred to herein as a base station to which the victim UE is associated, is receiving transmissions from a UE in the UL. The different resource allocations result in interference between the base stations. This will in turn affect the DL transmissions in the victim cell and thus inter-cell measurement is needed.

SUMMARY

The object of the present invention can be achieved by a method performed by a first terminal in a wireless communication system, the method comprising: receiving, from a second terminal, at least one sounding reference signal, SRS; measuring an inter-node measurement based on the SRS, wherein the inter-node measurement comprises at least one SRS-reference signal received power, RSRP; determining whether to report the inter-node measurement to a base station, BS; and reporting, to the BS, the inter-node measurement, wherein the inter-node measurement is used for adjusting a timing advance, TA, of uplink or downlink configuration of the first terminal to avoid subsequent inter-node interference.

Advantages, and salient features of the invention will become apparent to those skilled in the art from the following detailed description, which, taken in conjunction with the annexed drawings, discloses exemplary embodiments of the invention.

Accordingly present invention, inter communication device measurement for interference and timing advance can be performed efficiently.

BRIEF DESCRIPTION OF THE DRAWINGS

Further details, aspects and embodiments of the invention will be described, by way of example only, with reference to the drawings. In the drawings, similar reference numbers are used to identify like or functionally similar elements. Elements in the figures are illustrated for simplicity and clarity and have not necessarily been drawn to scale.

DETAILED DESCRIPTION

In recent years, third generation (3G) wireless communication has evolved to the long term evolution (LTE) cellular communication standard, sometimes referred to as $4^{th}$ generation (4G) wireless communications. Both 3G and 4G technologies are compliant with third generation partnership project (3GPP) standards. 4G networks and phones were designed to support mobile internet and higher speeds for activities, such as video streaming and gaming. The 3GPP standards are now developing a fifth generation (5G) of mobile wireless communications, which is set to initiate a step change in the delivery of better communications, for example powering businesses, improving communications within homes and spearheading advances such as driver-less cars.

One of the potential technologies targeted to enable future cellular network deployment scenarios and applications is the support for wireless backhaul enabling flexible and very dense deployment of 5G-new radio (NR) cells without a need for densifying the transport network proportionately. With these new networks/wireless communication systems, there is an expected larger bandwidth available for NR, as compared to long term evolved (LTE) (e.g. mmWave spectrum).

Communication systems can be configured for both time division duplex (TDD) operation and frequency division duplex (FDD) operation. In TDD systems, the base stations transmit and receive on the same carrier frequency. Uplink (UL) and downlink (DL) transmissions are separated in time by designating sub-frames as either UL sub-frames or DL sub-frames. In FDD systems, separate carrier frequencies are used for UL and DL transmissions.

In both TDD and FDD systems, there is always co-channel interference that needs to be taken into account. For DL communications, a UE receives interfering signals from the base stations in neighboring cells, whilst receiving a DL transmission from its serving cell. The neighboring cell interference impairs the reception of the desired DL signals from the serving cell. For UL communications, a serving base station experiences interference from Ues transmitting on the UL in neighboring cells.

In FDD, UL and DL are on different carrier frequencies, so there is no co-channel interference between UL and DL. However, there is still cross-channel interference that needs to be handled by, say, duplex filters. In TDD, UL and DL are on the same frequency. Hence, a DL transmission in one cell may cause interference with an UL transmission in a neighboring cell. To mitigate this type of interference, TDD systems are usually time synchronized and aligned such that all cells transmit and receive at the same time. Guard periods may also be inserted at the UL-DL switching points.

In reconfigurable TDD systems, the TDD configuration may be changed depending on traffic demands, say, on a cell-by-cell basis. As a result, two neighboring base stations may use respective different resource allocations for UL and DL, which may result in DL-to-UL interference, i.e., a transmitting base station to receiving base station interference. DL-to-UL interference, referred to herein as cross-link interference (CLI), occurs when one base station, referred to herein as a base station to which the aggressor UE is associated, is transmitting on the DL, while a second base station, referred to herein as a base station to which the victim UE is associated, is receiving transmissions from a UE in the UL. The different resource allocations result in interference between the base stations.

Out of all the interference scenarios in TDD systems, DL-to-UL CLI interference is expected to impact the victim cell the most. This is due to the fact that the coupling between the base stations is very high in many cases, e.g. due to a direct line-of-sight (LOS) path between them. This coupling will cause severe interference for the base station to which the victim UE is associated, when receiving UL control and data channels. This will in turn affect the DL transmissions in the victim cell and thus inter-cell measurement is needed.

Another interference scenario in TDD systems is UL-to-DL interference, where the UE receives its signals from its serving base station/NodeB/gNB in DL whilst at the same time receives interference from a neighboring UE in an adjacent cell transmitting in UL. This will in turn affect the DL reception in the victim UE, and thus inter-UE measurement is needed.

In order to mitigate the perceived CLI problems in 5G, with and without assumptions on inter-cell coordination, studies and proposals have been focused on the following schemes from both inter-UE and inter-node measurement perspectives: (i) Advanced receiver for interference cancellation/suppression; (ii) RS design (e.g. sounding reference signal RS (SRS) for inter-UE and synchronization signal block (SSB) for inter-node) and timing alignment between DL and UL; (iii) Sensing/measurement schemes (e.g. LBT-like, OTA measurement, if any, etc.); and (iv) Power control and coordinated schemes (e.g. coordinated beamforming/scheduling, network coordination, over-the-air (OTA) signaling if any, etc.).

In order to support a flexible duplexing/resource adaptation for unpaired NR cells, a Transmission Reception Point (TRP) and/or a UE has to take into account synchronization requirements that may result in, at the same time, some parts of a time slot being synchronized with TRPs from its own serving cell (self TRPs) and other part(s) of the time slot being synchronized with neighbor TRPs, which means that there will be multiple Tas (e.g. timing advance values) in one slot/time interval (e.g. the data part of a slot can adjust its timing independently).

In the current 5G specification, the timing advance for Ues depends on the propagation delays between the UE and its serving gNB, and the timing advance is configured by its serving gNB based on normal transmissions between the two communication devices. However, in practice, let us assume that a first UE transmits in its UL channel to its serving (first) gNB and a neighboring second UE is receiving communications from its serving (second) gNB. In such a scenario UL-to-DL interference may occur due to a large power signal transmitted from the first UE (sometimes referred to as an aggressor) to the receiver of the second UE (sometimes referred to as a victim). However, the timing advance does not take account of UE-to-UE interference.

Within the 5G standard, the following CLI measurements are supported for inter-UE: (i) sounding reference signal (SRS) reference signal received power (RSRP) SRS-RSRP, which is a linear average of the power contributions of the sounding reference signal (SRS) to be measured over the configured resource elements within the considered measurement frequency bandwidth in the time resources in the configured measurement occasions; (ii) Received signal strength indication (RSSI), which is a linear average of the total received power observed only in certain orthogonal frequency division multiplex (OFDM) symbols of measurement time resource(s), in the measurement bandwidth, over the configured resource elements for measurement by the UE. In this context, for SRS-RSRP, the number of SRS to be monitored by the UE should not exceed 8 within a slot, and where the network may configure more than 8 SRSs over different slots the total number of SRSs to be monitored by a UE should not exceed '32' SRSs. The UE is not required to perform time tracking or time adjustment, other than a constant offset relative to its own DL timing in order to perform SRS-RSRP measurement.

Thus, there exists a desire to improve, reduce or mitigate CLI, for example in 5G systems preferably that provides no or very minimal impact on radio frequency requirements of communication units, which will incur unnecessary expense and complexity.

Examples of the invention describe a wireless communication system that includes a mechanism for inter-node measurements. In some of the described examples, the nodes may be mobile nodes, e.g. Ues and in some examples the nodes may be serving nodes, e.g., base stations, NodeBs, gNBs or inter-IAB nodes. Specific references to particular inter-node measurements should be considered as being applicable to and encompassing other inter-node measurements, unless expressly indicated otherwise. Examples of the invention describe a range of approaches on how to perform inter-node measurements and thereafter how to report such measurements.

Some examples of the invention are described with reference to CLI interference measurement and mitigation. However, it is envisaged that CLI mitigation is only one possible use of the concepts herein described as to how and when inter-node measurements may be used. In some other examples, it is envisaged the inter-node measurements herein described, may include backhaul link quality monitoring in IAB networks.

In accordance with some examples of the invention, and say in order to determine and mitigate CLI interference, it is proposed that a victim UE measures this inter-UE interference. In examples of the invention, the first (aggressor) UE transmits SRS and the second (victim) UE measures the SRS. After measurement of the SRS, the second (victim) neighboring UE may report the measurement results back to its serving (second) gNB. In accordance with examples of the invention, the serving (second) gNB is then able to use such an interference measurement report to adjust its own UL/DL configuration in order to avoid subsequent interference. In accordance with some examples of the invention, when a measurement offset is adopted by the victim UE, a propagation delay between the first (aggressor) UE and the second (victim) UE when sending and receiving the SRS for CLI measurement, and TA values for UE A and UE B, may be taken into account.

For an inter-node case, one node needs to measure the signal strength from its surrounding nodes. Such measurements can be used in CLI DL-to-UL inter-cell CLI mitigation as mentioned. Moreover, it can also be used in the backhaul link quality monitoring in IAB systems.

Although example embodiments of the invention are described with reference to a 5G architecture, it is envisaged that some aspects of the invention are not so constrained/limited. For example, it is envisaged that the configurations may be enacted for a Long Term Evolved (LTE) system, or other such communication systems.

Figure 1:
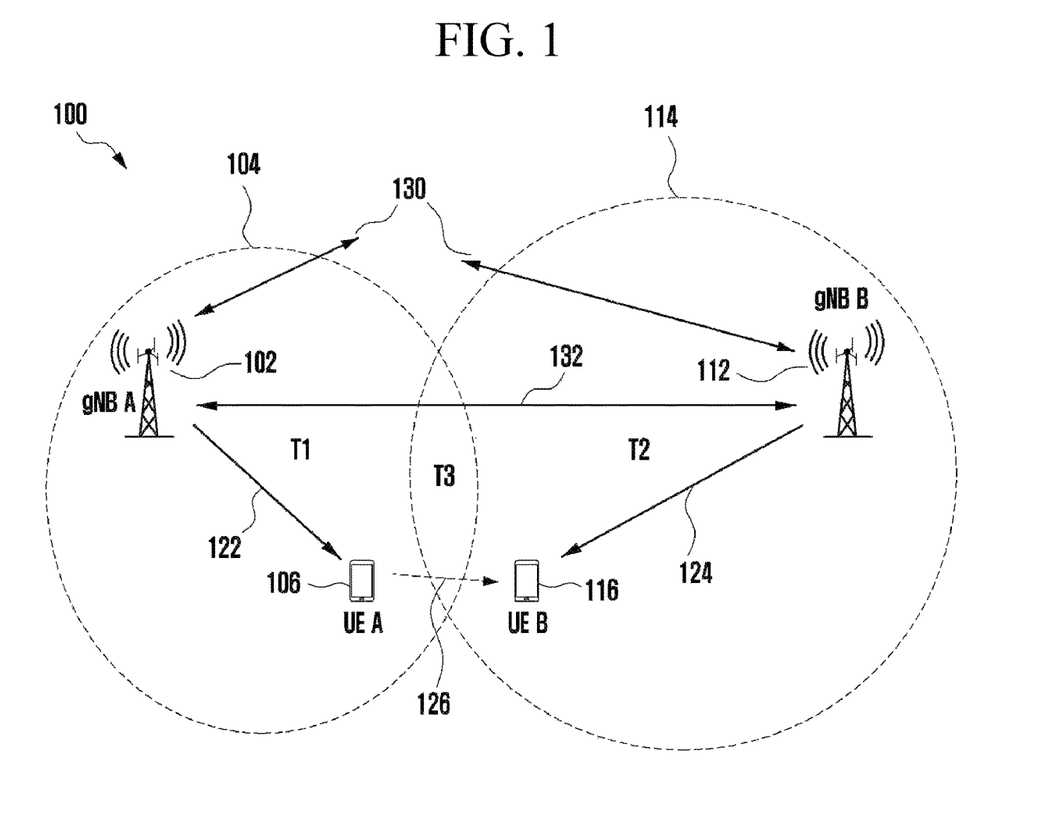
FIG. 1 illustrates a known simplified 5G architecture, according to some examples of the invention.

Referring to FIG. 1, a simplified example 5G system architecture diagram 100 illustrates how inter-node interference may be determined, reported and how timing advance may be employed for SRS-RSRP signals, in accordance with some examples of the invention.

Here, at least one first base station 102, such as a 5G gNB A, supports communications within a coverage area 104, including communication support for at least one wireless communication unit, sometimes referred to as a terminal device, such as user equipment UE 106. In 5G, the UE 106 is able to support traditional Human Type Communications (HTC) or the new emerging Machine Type Communications (MTC). The known simplified example 5G architecture diagram 100 includes at least one second base station 112, such as a 5G gNB, supporting communications within a second coverage area 114, including communication support for at least one UE B 116.

In addition, in accordance with some examples of the invention, the base stations 102, 112 are configured to support a wireless backhaul connection, such as wireless backhaul connection 132, e.g. generally an Xn (based on X2) interface that connects the base station with one or more other base stations, to enable inter-network connectivity, in accordance with some examples of the invention. For example, wireless backhaul connection may be configured to exchange intended UL/DL configuration between base stations (e.g. gNBs) in order to mitigate CLI. The 5G base stations 102, 112 may also be connected to a core network via a more traditional wired connection, such as fiber 130.

In the example 5G system architecture diagram 100, UE A 106 communicates with its serving base station 102 and UE B 116 communicates with its serving (second) base station 112, e.g. 5G gNB B. In addition, UE A 106 is illustrated as transmitting sounding reference signals (SRS) to its serving base station 102. The SRS is monitored and measured 126 by neighboring UE B 116 in SRS-RSRP measurements as part of a cross-link interference (CLI) measurement. The CLI measurements are intrinsically dependent upon the propagation delay between the various communicating entities. For example, a first propagation delay T1 122 exists between UE A 106 and its serving (first) base station 102 and a second propagation delay T2 124 exists between UE B 116 and its serving (second) base station 112. A third propagation delay T3 126 exists between UE A 106 and UE B 116 for SRS transmissions by UE A 106 that are received at UE B 116.

Figure 2:
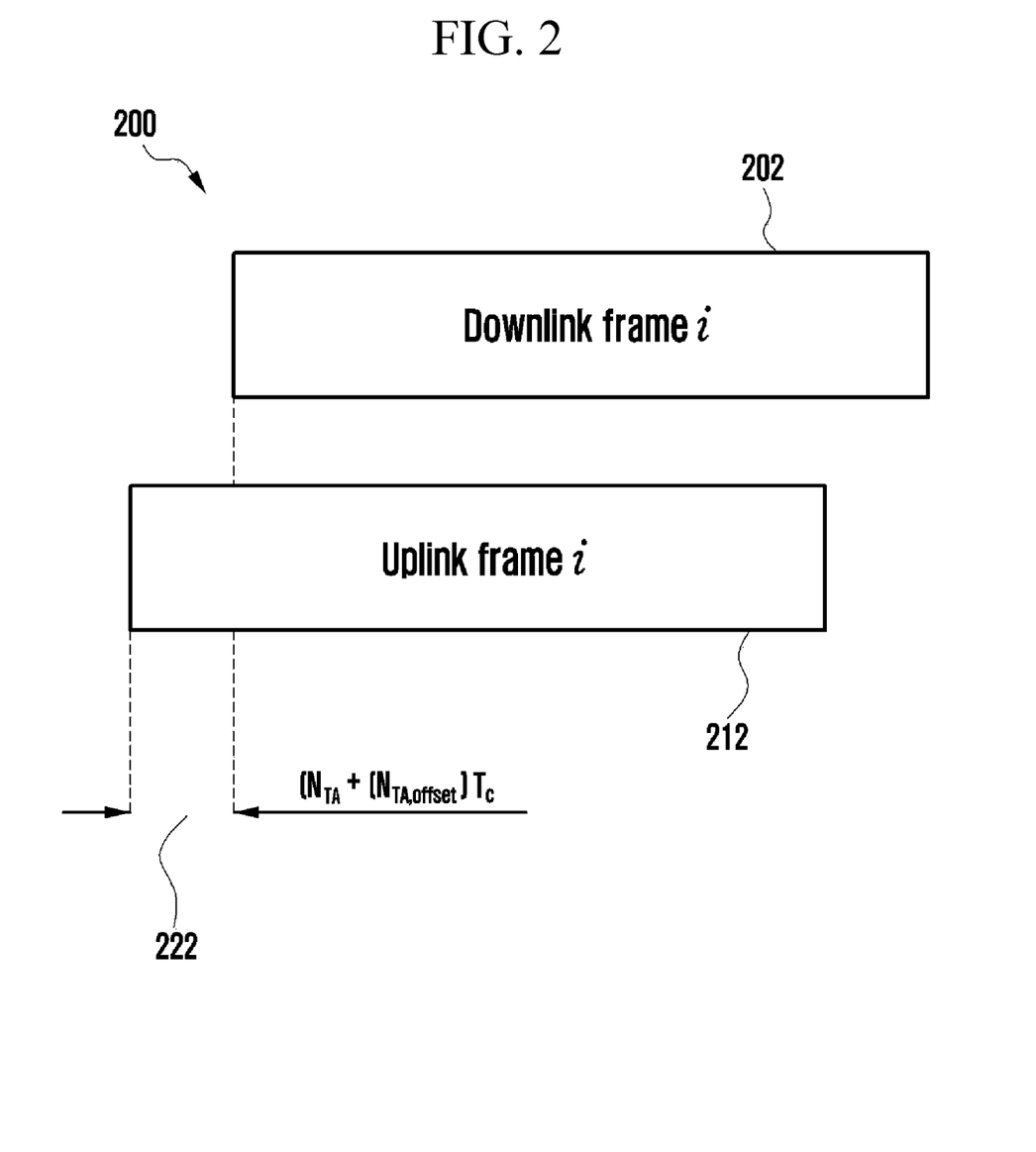
FIG. 2 illustrates a simplified 5G Uplink-downlink timing relationship, according to some examples of the invention.

UE A 106 transmits one or more SRS and UE B 116 measure SRS-RSRP. The timing advance for UE A 106 equates to:

$$T_{TA}(N_{TA} \pm N_{TA,offset})T_C \quad [1]$$

before the start of the corresponding downlink frame at the UE A 106, as shown in FIG. 2.

Referring now to FIG. 2, a simplified 5G uplink-downlink timing relationship 200 is illustrated, according to some examples of the invention. FIG. 2 illustrates a downlink frame 202 and an uplink frame 212 and a timing difference 222, as perceived at UE A 106 of the difference there between. The timing difference is the time lapse between a transmission of an uplink frame to its serving (first) base station 112, and a reception of a frame from its serving (first) base station 112 after it was transmitted. Here, the propagation delay for UE A T1 may be expressed as:

$$2T1 = N_{TA,UEA} * T_C \quad [2]$$

Similarly, the propagation delay for UE B T2 may be expressed as:

$$2T2 = N_{TA,UEB} * T_C. \quad [3]$$

Figure 3:
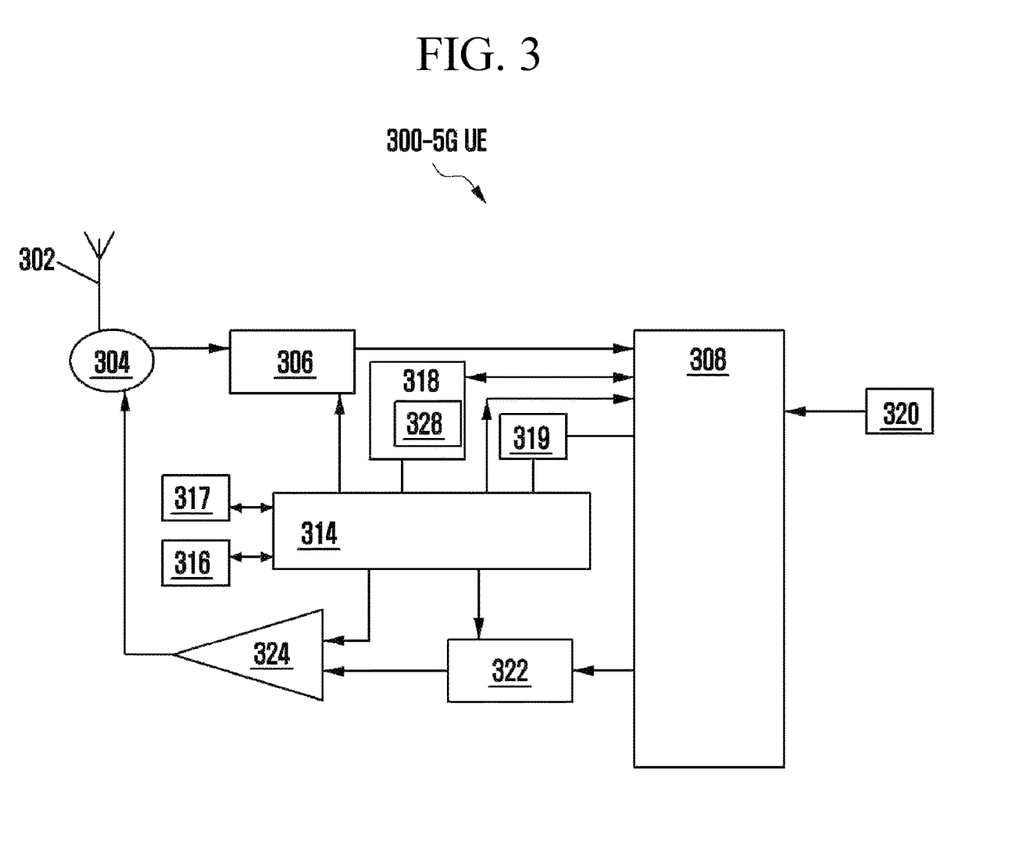
FIG. 3 illustrates a block diagram of an UE, adapted in accordance with some example embodiments of the invention.

FIG. 3 illustrates a high level block diagram of a wireless communication unit, such as a user equipment (UE) 300, e.g. UE 116 from FIG. 1, that contains an antenna 302, for receiving transmissions, coupled to an antenna switch or duplexer 304 that provides isolation between receive and transmit chains within the UE 300. One or more receiver chains, as known in the art, include receiver front-end circuitry 306 (effectively providing reception, filtering and intermediate or base-band frequency conversion). The receiver front-end circuitry 306 is coupled to a signal processor 308 (generally realized by a digital signal processor (DSP)). A skilled artisan will appreciate that the level of integration of receiver circuits or components may be, in some instances, implementation-dependent.

The controller 314 maintains overall operational control of the wireless communication unit 300. The controller 314 is also coupled to the receiver front-end circuitry 306 and the signal processor 308. In some examples, the controller 314 is also coupled to a frequency generation circuit 317 and a memory device 316 that selectively stores operating regimes, such as decoding/encoding functions, synchronization patterns, code sequences, and the like. A timer 318 is operably coupled to the controller 314 to control the timing of operations (e.g. transmission or reception of time-dependent signals) within the UE 300. In particular, in accordance with examples of the invention, the timer 318 comprises a timing advance circuit 328 that is operationally responsive to the signal processor 308 and/or controller 314.

As regards the transmit chain, this essentially includes an input circuit 320, coupled in series through transmitter/modulation circuitry 322 and a power amplifier 324 to the antenna 302, antenna array, or plurality of antennas. The transmitter/modulation circuitry 322 and the power amplifier 324 are operationally responsive to the controller 314.

The signal processor 308 in the transmit chain may be implemented as distinct from the signal processor in the receive chain. Alternatively, a single processor may be used to implement a processing of both transmit and receive signals, as shown in FIG. 3. Clearly, the various components within the wireless communication unit 325 can be realized in discrete or integrated component form, with an ultimate structure therefore being an application-specific or design selection.

In accordance with examples of the invention, the signal processor 308 and transceiver (e.g. transmitter/modulation circuitry 322) of UE 300 are configured to communicate with a serving base station (e.g. UE 106 and 5G gNB 116 in FIG. 1). For some high-complexity and high-energy Ues, the signal processor 308 and receiver front-end circuitry 306 may be configured to perform SRS-RSRP measurements, which require correlation at the UE 300. However, for some low-complexity and/or low-energy Ues, the signal processor 308 and receiver front-end circuitry 306 may not be able to perform a RSRP measurement. In this context, the UE 300 may be only able to be configured to perform received signal strength indication (RSSI) measurements for all signals received on the configured resources, e.g. signals from its serving base station 116 as well as interference sources. In accordance with examples of the invention, in response to a measurement of the SRS from the neighboring UE, e.g. aggressor UE A 102 in FIG. 1, the signal processor 308 and transceiver (e.g. transmitter/modulation circuitry 322) of UE 300 are configured to report its SRS measurement back to its serving gNB, e.g., gNB B 116 in FIG. 1. In some examples, the UE 300 may also report its measurement capability, e.g. that it is only able to make an RSSI measurement, in the measurement report, which can be on a per bandwidth part (BWP) basis.

The signal processor 308 and receiver front-end circuitry 306 are also configured to determine timing advance information. Furthermore, the timing advance of UE 300 will not be changed further, as a timing offset between the receive timing of UE 300 and the receive timing of the SRS (TO, received from a neighboring interference source) is known to UE 300. Hence, in this situation, UE B is able to adjust its own measurement timing following a measurement of the SRS from neighboring interference source, such as UE A 102 in FIG. 1.

In accordance with some examples of the invention, the signal processor 308 and transceiver (e.g. transmitter/modulation circuitry 322) of the UE 300 are configured for UE SRS-RSRP measurements. In this example, the signal processor 308 is configured to determine whether transmission timing offset has been enabled, for example in timer circuit 318. If transmission timing offset has been enabled the signal processor 308 or controller 314 is configured to adjust the measurement timing based on a measured and predetermined or selected transmission offset.

Thereafter, if measurement timing offset has been enabled at the UE 300, the UE 300 adjusts its measurement timing based on the measured offset and performs one or more SRS-RSRP measurements.

In accordance with some examples of the invention, the signal processor 308 and transceiver (e.g. transmitter/modulation circuitry 322) of the UE 300 are configured to perform both SRS-RSRP and/or RSSI measurements, when CLI mitigation operation is enabled, say in signal processor 308 or controller 314. These two measurements may be configured separately, for example in a TDM manner, and the resources for two measurements can be configured in TDM/FDM mode. For example, it might not be necessary to identify the CLI level at the beginning. Instead, it is envisaged that in some examples the RSSI measurement may be first triggered to measure the overall levels of interference. Thereafter, in some examples, if this overall level of interference is above a certain threshold, such that the performance is affected, a subsequent SRS-RSRP operation can be triggered to measure the CLI level.

For triggering CLI measurement/reporting, it is envisaged that different mechanisms may be supported for separation configuration of SRS-RSRP and RSSI measurements and reporting. For example, it is envisaged that RSSI may be triggered in response to a determined higher block error rate (BLER), and SRS-RSRP can be triggered by the determined RSSI level exceeding a certain threshold.

In accordance with some examples of the invention, the signal processor 308 and transceiver (e.g. transmitter/modulation circuitry 322) of the UE 300 are configured to formulate and transmit SRS-RSRP measurement reports and CLI-RSSI measurement reports to the serving base station, e.g. gNB. In some instances, the respective measurement reports may be configured to be sent together. In this example, the same triggering mechanism may be used for both RSSI and RSRP measurements.

In accordance with some examples of the invention, the signal processor 308 and transceiver (e.g. transmitter/modulation circuitry 322) of the UE 300 are configured to perform a cell level measurement, based on RSSI, but where a UE group or UE level measurement is then based on SRS-RSRP. In this manner, the overall CLI level and main aggressor or aggressor group can be identified at the same time. Furthermore, in this manner, the RSSI measurement is performed at a cell level and, thus, the measurement is less complicated. Hence, the configured resources for measurement can be fewer. However, as a consequence and as would be appreciated by a skilled person, this approach provides less comprehensive and less accurate information for CLI mitigation.

In accordance with an alternative example of the invention, the signal processor 308 and transceiver (e.g. transmitter/modulation circuitry 322) of the UE 300 are configured to perform a UE group level measurement based on RSSI, but a subsequent UE level measurement is based on SRS-RSRP. In this manner, RSSI measurement is performed in a UE group level. Thus, the measurement is more complicated and the configured resources for measurement can be more than the preceding approach. This approach may provide more comprehensive and accurate information for CLI mitigation.

In accordance with a further alternative example of the invention, the signal processor 308 and transceiver (e.g. transmitter/modulation circuitry 322) of the UE 300 are configured to perform overall interference measurement based on RSSI, but thereafter a cell level measurement based on SRS-RSRP is performed. This approach requires a minimum RSSI measurement and provides minimum information.

In accordance with some examples of the invention, simultaneous measurements of RSRP and RSSI can also be supported and time/frequency resources that are to be measured can be decided separately or jointly. In this context, in some examples of the invention, it is envisaged that the SRS-RSRP measurement resources and RSSI measurement resources should at least be partially overlapped or fully overlapped, e.g., all SRS resources configured for SRS-RSRP measurement are within the measurement resource for RSSI measurements. Advantageously, this approach supports reduced signaling overhead. In some examples, it is envisaged that the configured resources may be within the same time slot, or may be interleaved for every K slots, e.g., K for RSSI and the next K slots configured for RSR-RSRP. This approach requires less resources for measurement, but causes more complexity for the UE measurement configuration.

In some examples, it is envisaged that the configured resources may be allocated as non-overlapping resources. Here, the configured resources may again be allocated within the same time slot, or alternatively configured resources may be interleaved for every K slots, e.g., K for RSSI and the next K slots configured for SRS-RSRP. This approach requires more resources for measurements, but the UE measurement configuration can be advantageously more flexible.

In general, therefore, it is envisaged that SRS-RSRP measurement and reporting can be triggered by RSSI measurements, particularly when RSSI is higher than a certain threshold. Then, in some examples, it is envisaged that SRS-RSRP can be used to identify the aggressor Ues or aggressor UE groups.

Thus, so far, inter-node measurements in a form of mobile nodes have been described, for example with respect to only inter-UE measurements by UE 300. However, it is also envisaged in other examples, that inter-node measurements may be used for inter-base station (e.g. inter-nodeB or inter-gNB or inter-IAB node) measurements, as described with reference to FIG. 4.

Figure 4:
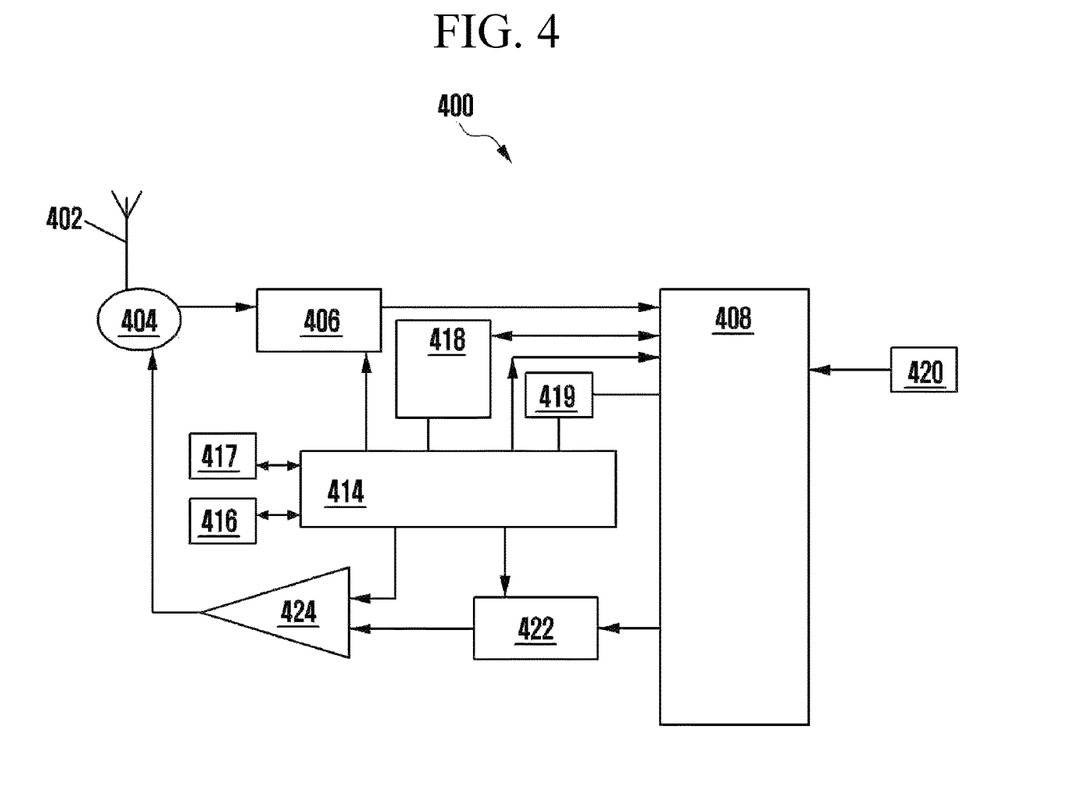
FIG. 4 illustrates a block diagram of a base station (or nodeB or gNodeB), adapted in accordance with some example embodiments of the invention.

Referring now to FIG. 4, high level block diagram of base station 400 (e.g. a 5G wireless base station or 5G gNB such as gNBs 102, 112 in FIG. 1) is illustrated, where the base station 400 has been adapted in accordance with some example embodiments of the invention. The base station 400 contains an antenna 402, for receiving transmissions, coupled to an antenna switch or duplexer 404 that provides isolation between receive and transmit chains within the base station 400. One or more receiver chains, as known in the art, include receiver front-end circuitry 406 (effectively providing reception, filtering and intermediate or base-band frequency conversion). The receiver front-end circuitry 406 is coupled to a signal processor 408 (generally realized by a digital signal processor (DSP)). A skilled artisan will appreciate that the level of integration of receiver circuits or components may be, in some instances, implementation-dependent.

The controller 414 maintains overall operational control of the base station 400. The controller 414 is also coupled to the receiver front-end circuitry 406 and the signal processor 408. In some examples, the controller 414 is also coupled to a frequency generation circuit 417 and a memory device 416 that selectively stores operating regimes, such as decoding/encoding functions, synchronization patterns, code sequences, and the like. A timer 418 is operably coupled to the controller 414 to control the timing of operations (e.g. transmission or reception of time-dependent signals) within the base station 400. In particular, in accordance with examples of the invention, the timer 418 is operationally responsive to the signal processor 408 and/or controller 414.

As regards the transmit chain, this essentially includes an input circuit 420, coupled in series through transmitter/modulation circuitry 422 and a power amplifier 424 to the antenna 402, antenna array, or plurality of antennas. The transmitter/modulation circuitry 422 and the power amplifier 424 are operationally responsive to the controller 414. The signal processor 408 in the transmit chain may be implemented as distinct from the signal processor in the receive chain. Alternatively, a single processor may be used to implement a processing of both transmit and receive signals, as shown in FIG. 4. Clearly, the various components within the base station 400 can be realized in discrete or integrated component form, with an ultimate structure therefore being an application-specific or design selection.

In accordance with examples of the invention, base station 400 is tasked with performing SRS-RSRP measurements (e.g. gNB measurements of SRS-RSRP). In accordance with some examples of the invention, the signal processor 408 and receiver front-end circuitry 406 may be arranged to configure the transmission timing of aggressor UE A by a timing offset, and this timing offset can be 2T1 (or −2T1).

In addition, in accordance with some examples of the invention, the base station 400 is configured to support a wireless backhaul connection, such as wireless backhaul connection 132 in FIG. 1, e.g. generally an Xn (based on X2) interface that connects the base station 400 with one or more other base stations, to enable inter-network connectivity, in accordance with some examples of the invention. For example, wireless backhaul connection may be configured to exchange intended UL/DL configuration between base stations (e.g. gNBs) in order to mitigate CLI. In accordance with some examples of the invention, for 5G-new radio (NR) cells, the intended UL/DL symbol/slot can be either configured semi-statically or dynamically.

In some examples, the exchange of intended UL/DL configuration information may be made when needed. In a first example, only semi-static configuration of UL/DL may be exchanged. In this first example, the base station to which the aggressor UE is associated or victim base station to which the victim UE is associated, of CLI may only adapt their own UL/DL configuration in a semi-static way, but the approach requires less signaling overhead and the change of its own UL/DL configuration in order to mitigate interference is more suitable for L3 measurements. In a second example, only dynamic configuration of UL/DL information may be exchanged. In this second example, the aggressor/victim UE of CLI may adapt their own UL/DL configuration in a more prompt and dynamic way. However, this approach may increase the signaling overhead between gNBs. Moreover, for both the SRS-RSRP and RSSI approaches to obtaining interference information, layer-3 (L3) measurement reporting may be applied to target long term measurements, whereas dynamic UL/DL configuration updates to mitigate CLI may require short term measurement. In some examples, both semi-static of UL/DL information e.g. when the interference situation changes fast and dynamic configuration of UL/DL information, e.g. when the interference situation changes fast, may be exchanged. This third example provides more flexibility, but does require more signaling overhead.

In NR, the TDD configuration comprises both UL and DL configurations as well as a flexible part, which is sometimes referred to as a remaining timing part. In accordance with some examples of the invention, the signal processor 408 and transceiver (e.g. transmitter/modulation circuitry 422) of the base station 400 are also configured to indicate the remaining timing region.

If the remaining timing region is indicated as unused to the base station to which the victim UE is associated, from an aggressor perspective, the implication is that there is no transmission/reception in this region. Thus, there is no need to coordinate UL/DL configuration for CLI mitigation. However, in some instances, the remaining unused region(s) may contain flexible resources that can be scheduled as UL or DL by the base station to which the victim UE is associated, and thus may suffer from CLI from the base station to which the aggressor UE is associated. In accordance with examples of the invention, such remaining unused timing region(s) may be exchanged between two base stations, such as two gNBs. In an extreme case where all the symbols in the transmission are configured as flexible, the base station to which the aggressor UE is associated may be able to configure its own UL/DL without any constraint and significant CLI can potentially be generated. In this regard, and in accordance with some examples of the invention, the remaining region may be interpreted as 'flexible' until it is further configured as UL/DL or unused. Therefore, in accordance with some examples of the invention, both flexible and unused indications of a remaining timing region may be supported, where the remaining timing region is not indicated as DL or UL.

In accordance with some examples of the invention, the signal processor 408 and transceiver (e.g. transmitter/modulation circuitry 422) of the base station 400 may be additionally configured to indicate information, such as 'flexible' or 'unused' timing regions. For example, it is envisaged that, in some examples, both static/semi-static and dynamic direction and/or unused part(s) of remaining region may be indicated. In other examples, it is envisaged that only static/semi-static direction and/or unused parts of remaining region may be indicated. In other examples, it is envisaged that the remaining region may be indicated as unused unless the CLI level is higher than a certain threshold, in which it may be indicated as UL/DL and/or unused.

In accordance with some examples of the invention, the signal processor 408 and transceiver (e.g. transmitter/modulation circuitry 422) of the base station 400 may be additionally configured to perform inter-node measurements at a base station level. In this example, the base station 400 may exchange and indicate information, such as inter-base station measurements as well as dynamic scheduling information, to one or more other base stations in an inter-base station/inter-gNB manner.

In this base station context, and in some examples of the invention, the inter-node measurement may include a timing issue and use of RS configuration for inter-node measurements. Synchronization between two nodes needs to be maintained, e.g., in the DL. In such a case, the timing difference (Td) should be signaled from a first base station, e.g. a first gNB such as gNB 112 in FIG. 1, to another base station, e.g. a second gNB such as gNB 102 in FIG. 1.

In the case of multiple nodes (or base stations in this inter-node example), it is envisaged that one or more of the following timing differences (Td) may be signalled, where N is the number of all nodes:

$Td = \min\{Td1, \ldots, TdN\};$ $Td = \max\{Td1, \ldots, TdN\};$ $Td = \text{average of } \{Td1, \ldots, TdN\}.$ In some examples of the invention, if Td is transmitted aperiodically, it is envisaged that a triggering mechanism may be employed in order to trigger a Td update. In this instance, it is envisaged that in some examples the Td update may be triggered by one or more of the following:
  (i) it is left up to the transmitting node, e.g., first base station A, to decide the triggering process, for example based on the system architecture implementation;
  (ii) transmitting node always calculates Td and sets a threshold. Once Td is larger than the threshold, a signaling is initiated sent to update Td. In this regard, it is envisaged that either new Td can be used to update the Td value or an offset of Td can be updated.

In some examples, for RS configuration for inter-node measurements in the context of inter-base station measurements, inter-gNB measurements, or inter-IAB node measurements instead of SRS, a synchronization signal block (SSB) can be employed. In essence, in this example, a node configures multiple sets, e.g., K, of SSBs, one for access UE and K−1 for inter-node measurements. Here, for example, K can be set in a range of [1, 64] and may depend on the topology used, a hop order employed, etc. Furthermore, in some examples, K may be configured either in a centralized manner or in a distributed manner, and in the latter case, additional signaling may be needed to indicate which SSB set is being used for access UE and which SSB set(s) is being used for inter-node measurement.

In some examples, it is envisaged that the signal processor 408 or controller 414 may configure such SSBs with one set of SSBs used for inter-node measurements with periodicity, offset, SSB indices etc. for each node. In some examples, the signal processor 408 or controller 414 may then configure a periodicity of, say, a muting pattern for SSB measurements, where a node can be muted in order to perform inter-node measurements based on this muting pattern, which can be repeated periodically. In some examples, the signal processor 408 or controller 414 may also configure a bitmap for a muting pattern within each period of the periodicity for SSB measurements that can be derived from, say, the length of the bitmap. Alternatively, in some examples, the signal processor 408 or controller 414 may configure a periodicity for SSB measurements and a specific Tx/Rx pattern for each node, which can be pre-defined or random and also periodically repeated, for this periodicity. At a minimum, in this example, the pattern with one node measuring at one time should be supported. For example, for a periodicity of '6' with six nodes trying to measure each other, it is envisaged that at least the following pattern of: 011111, 101111, 110111, 111011, 111101, 111110 is supported.

In other examples, it is envisaged that the signal processor 408 or controller 414 may configure multiple sets of SSBs with the same or different periodicity, offset, SSB indices etc.

In some examples, it is envisaged that the periodicity, as well as the offset values of inter-node SSB, may be extended. Here, for example, periodicity may be configured to be larger than the current maximum SSB periodicity, i.e., 160 msec. For example, the periodicity may be configured to be in a range of [320, 2560] msec. Likewise, in some examples, it is envisaged that offset values may also be extended accordingly. Since the PBCH in such SSB may not be used, it is also envisaged that this can be used to point to the SSB for initial access.

Thus, in this manner, it is envisaged that a node can assume different SSB periodicity for initial access and inter-node measurement. Such different periodicity can be either pre-defined, broadcasted or configured in a semi-persistent way.

For measurement of SSBs, it is also envisaged that multiple SMTC, e.g., K−1, with same or different periodicity, offset, etc., can be configured to measure the inter-node measurement SSBs. Alternatively, a single SMTC can be configured for inter-node measurement, and when it collides with inter-node SSB transmission from itself, it can be overridden, so that a node is able to transmit the SSB.

Thus, examples of the invention also describe a wireless communication system 100 that comprises a plurality of serving communication nodes configured for inter-node measurements there between and configured to serve communication nodes, wherein a first serving communication node 112 of the plurality of serving communication nodes comprises a controller 414 that configures multiple sets of synchronization signal blocks, SSBs, where at least one of the SSBs is allocated for wireless communication unit access to the serving communication node and a remaining number of the multiple sets of configured SSBs is allocated for the serving communication node 112 to perform a number of inter-node measurements with at least a second serving communication node 102.

In some examples, the controller 414 may be configured to implement a muting pattern for transmissions to or from the first serving communication node 112 in order to perform inter-node measurements based on this muting pattern, which may be repeated periodically. In some examples, the controller 414 may configure a bitmap for the muting pattern within each period of the periodicity, where SSB measurements can be derived from a length of the bitmap. In some examples, the controller 414 may configure a periodicity for SSB measurements and a transmit-receive pattern for the first serving communication node, wherein the transmit-receive pattern is periodically repeated and pre-defined or random for the periodicity. In some examples, the controller 414 may configure a first SSB periodicity pattern to allow initial access to the first serving communication node 112 by a served communication node, and a second SSB periodicity muting pattern to facilitate inter-node measurement that avoids subsequent inter-node interference, for example where the periodicity patterns may be either pre-defined, broadcasted or configured in a semi-persistent manner.

Figure 5:
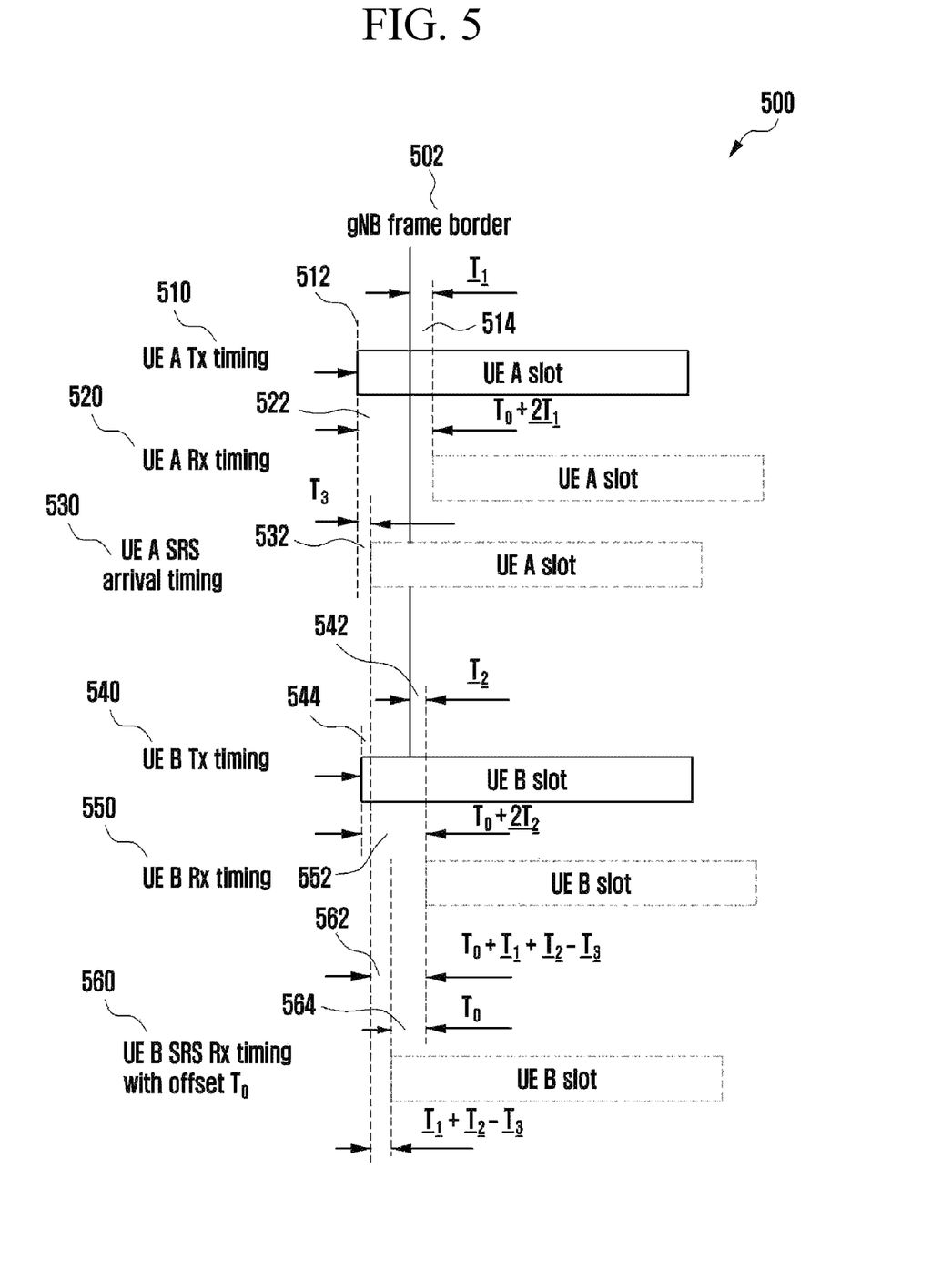
FIG. 5 illustrates a Timing representation indicating the timing offsets and compensation timing advance applied, according to some examples of the invention.

Referring now to FIG. 5, illustrates an example of a timing representation 500 that indicates example timing offsets and compensation timing advance as may be applied in accordance with some examples of the invention. The timing representation 500 indicates a first UE, (UE A) transmit timing representation 510, noting that the timing representations 500 are not drawn to scale for clarity purposes only, as would be appreciated by a skilled person. The timing representation 500 further indicates a receiver timing representation 520 of the first UE (UE A) and a SRS arrival timing representation 530 of the first UE (UE A). The timing representation 500 also indicates a second UE, (UE B) transmit timing representation 540, a receiver timing representation 550 of the second UE (UE B) and a SRS arrival timing representation with offset (TO) timing 560 of the second UE (UE B).

In accordance with the above examples, if first UE (UE A) follows the above timing advance setting, due to a different propagation delay between propagation delay T1 (i.e. between gNB A and UE A) and propagation delay T3 (i.e. between UE A and UE B), there is a timing difference (562+564) between the measurement timing for UE B and the reception timing of SRS from UE A. This timing difference (562+564) can be expressed as T0+T1+T2−T3, where $T0=NT_{A,offset} \cdot T_C$. In order to align both the SRS reception timing and SRS-RSRP measurement timing, a constant offset may be assumed by the UE in accordance with some examples. For example, when a UE is configured to measure SRS-RSRP, the UE can assume a constant measurement offset based on its own DL timing as T0 or −T0 564, depending on the offset direction definition. With this assumption, the timing difference is reduced from T0+T1+T2−T3 to T1+T2−T3 562. Since TO 564 is significantly larger than T1+T2−T3 562, the remaining timing difference is much smaller.

In another example, when a UE is configured to measure SRS-RSRP, the UE can assume a constant measurement offset based on its own DL timing as T0+2T2 or −(T0+2T2) (562+2*542) depending on the offset direction definition. Here, T2 defines the delay between the gNB frame border and the timing of the receive slot by UE B in 550. With this assumption, the timing difference may be reduced from T0+T1+T2−T3 to T1−T2−T3. Since T1 514 is similar to T2 542, the remaining timing difference is approximately −T3 532, the propagation delay between UE A and UE B. In some examples, this approach may achieve better alignment. However, since the offset includes T1 514, it is not constant and thus may require more signaling overhead.

In another example, when a UE is configured to measure SRS-RSRP, the UE can assume a constant measurement offset based on its own DL timing as T0+T2 or −(T0+T2) depending on the offset direction definition. With this assumption, the timing difference may be reduced from T0+T1+T2−T3 to T1−T3 (i.e. the timing difference between 514 and the propagation delay between UE A and UE B 532).

In accordance with other examples, it is envisaged that the timing offset may also be configured from a transmission perspective. In this example, if the measurement timing offset is assumed to be T0 564, the transmission timing offset may be set as 2T1 (or −2T1), so that the final timing difference is T2−T1−T3, which can be very small.

In accordance with some examples, it is also envisaged that dedicated time/frequency resources may be needed and allocated for SRS-RSRP measurements. In this approach, a gap may be used to support SRS-RSRP measurements before and after the measurement window.

In accordance with some examples, it is also envisaged that even with additional measurements or transmission timing offsets, there may still be a remaining timing difference between a measurement of SRS-RSRP and a reception of the SRS. In this regard, in some examples, it is envisaged that the measurement accuracy specification may be relaxed, say by the signal processor 308 in FIG. 3. In this context, the relaxation may be implemented when it is determined that T1 and/or T2 is/are large and the remaining time different is longer than the cyclic prefix (CP).

In accordance with some examples, it is also envisaged that the UE may enable semi-persistently via, say, a radio resource control (RRC)/medium access layer (MAC) core equipment (CE) message or dynamically via downlink control information (DCI) depending on any determined timing advance (TA) values. In accordance with some examples, this may be triggered by a measurement of propagation delay T1 or T2. If T1 and/or T2 are too large, the measurement accuracy relaxation can be enabled, otherwise, it should be disabled.

In some instances, it is envisaged that the opportunity for measurement accuracy relaxation may always be enabled. In accordance with some examples, it is envisaged that the opportunity for measurement accuracy relaxation may always be disabled especially when T1 and T2 values are very small and only enabled when they are determined as being above a threshold, i.e. high.

Figure 6:
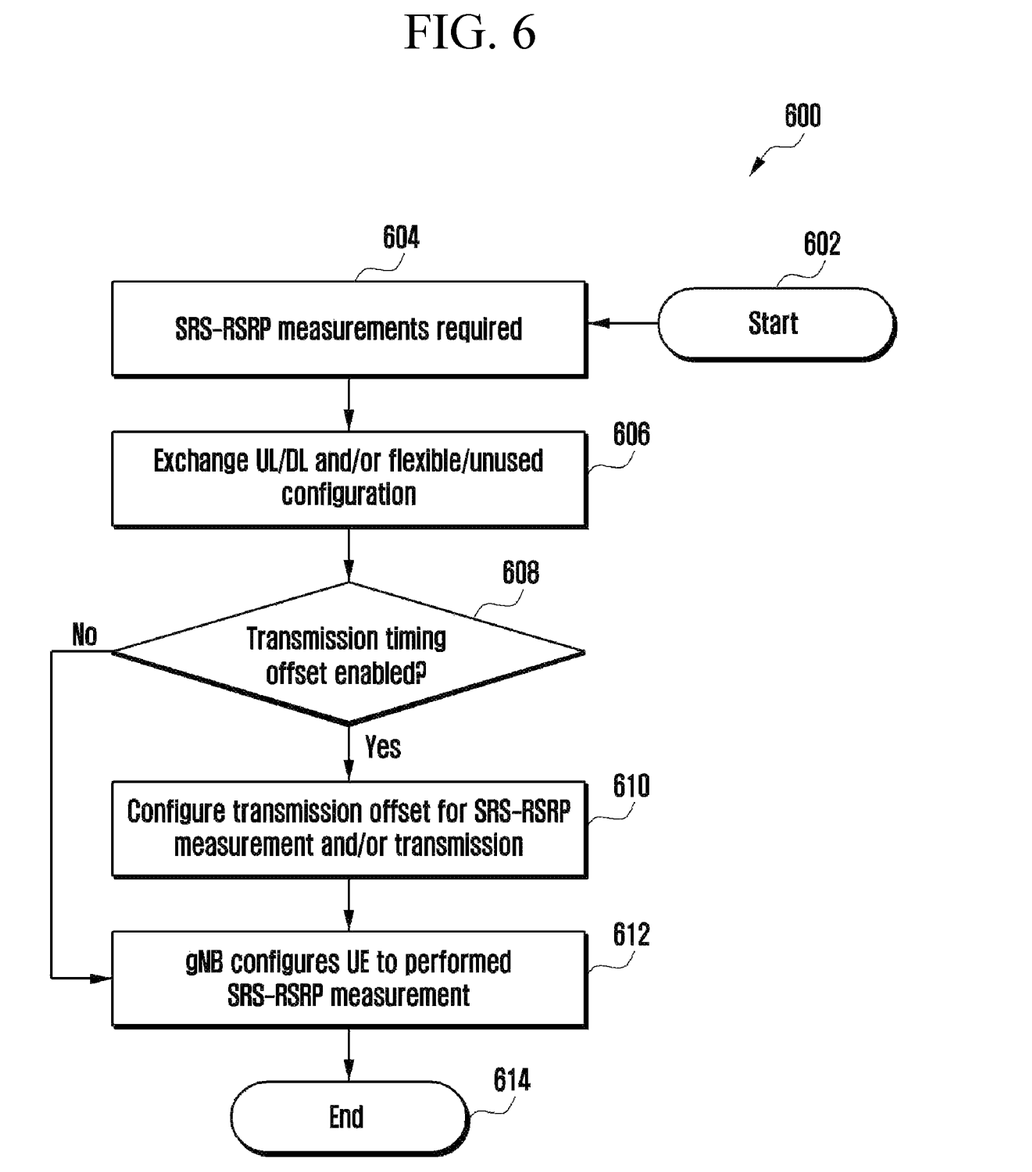
FIG. 6 illustrates a flowchart for gNB measurement, according to examples of the invention.

Referring now to FIG. 6, an example of a simplified flowchart 600 for base station (e.g. gNB) measurements of SRS-RSRP is illustrated, according to some examples of the invention. The flowchart 600 starts at 602 and the base station (e.g. gNB) is tasked with performing SRS-RSRP measurements at 604. At 606, any exchange of UL/DL and/or flexible/unused configuration is performed by the base station (e.g. gNB). At 608, a determination is made as to whether a transmission timing offset is enabled. If a transmission timing offset is not enabled at 608, the flowchart jumps to 612. If a transmission timing offset is enabled at 608, the base station (e.g. gNB) configures a transmission offset for SRS-RSRP measurement and/or transmission at 610 and then moves to 612. At 612, the gNB configures UE to perform SRS-RSRP measurement(s). The flowchart then stops at 614.

Figure 7:
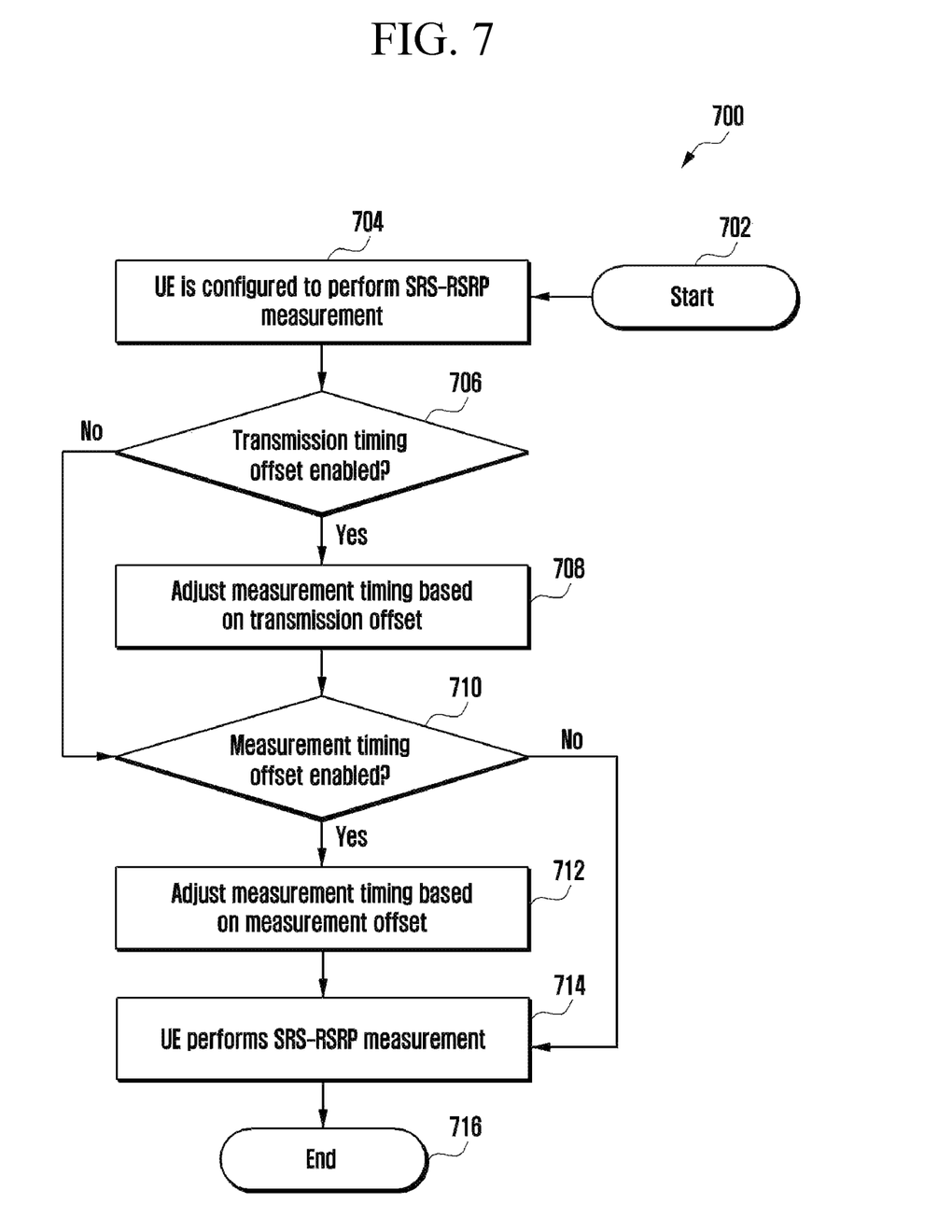
FIG. 7 illustrates flowchart for UE SRS-RSRP measurement, according to examples of the invention.

FIG. 7 illustrates Flow chart for UE SRS-RSRP measurement, according to examples of the invention. The flowchart 700 starts at 702 and the UE is configured to perform SRS-RSRP measurements at 704. At 706, a determination is made at the UE as to whether transmission timing offset has been enabled. If, at 706, transmission timing offset has not been enabled, the flowchart jumps to 710 and a determination is made at the UE as to whether measurement timing offset has been enabled. If, at 706, transmission timing offset has been enabled, the measurement timing is adjusted at 708 based on a measured and predetermined or selected transmission offset, and the flowchart transitions to 710. In some examples, there are two offsets considered at 708. A first offset is a measurement offset from a victim UE B perspective. This offset can be derived from its own TA value. Another offset is a transmission offset from an aggressor UE A perspective. This offset can also be derived from TA value of UE A. Therefore, other than signaling TA values to UE A from gNB A and UE B from gNB B, there is no extra signaling.

At 710, if the determination is that the measurement timing offset has been enabled at the UE, the UE adjusts its measurement timing based on the measured offset at 712. At 714, the UE then performs one or more SRS-RSRP measurements. In some examples, the UE may report the one or more SRS-RSRP measurements back to its serving base station (e.g. gNB) in a measurement report, as previously described. If the determination at 710 is that the measurement timing offset has not been enabled at the UE, the flowchart transitions to 714. The flowchart then stops at 716.

Thus, aspects of the invention provide a solution for SRS-RSRP measurement offset, and how the offset is derived by the UE, amongst other solutions. Details on. A constant offset of '0' is not precluded.

It is envisaged that TA values for UE A and UE B might need to be exchanged between gNB A and gNB B if further timing gap reduction is needed.

In particular, it is envisaged that the aforementioned inventive concept can be applied by a semiconductor manufacturer to any integrated circuit comprising a signal processor configured to perform any of the aforementioned operations. Furthermore, the inventive concept can be applied to any circuit that is able to configure, process, encode and/or decode signals for wireless distribution. It is further envisaged that, for example, a semiconductor manufacturer may employ the inventive concept in a design of a stand-alone device, such as a digital signal processor, or application-specific integrated circuit (ASIC) and/or any other sub-system element.

It will be appreciated that, for clarity purposes, the above description has described embodiments of the invention with reference to different functional units and processors. However, it will be apparent that any suitable distribution of functionality between different functional units or processors, for example with respect to the signal processor may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Thus, communication units such as gNBs and terminal devices such as Ues, a communication system and methods relating to inter-node measurements and reporting thereof, have been described, wherein the aforementioned disadvantages with prior art arrangements have been substantially alleviated.

What is claimed is:

1. A method performed by a first terminal in a wireless communication system, the method comprising:
   identifying at least one sounding reference signal (SRS) resource of a second terminal for a cross link interference (CLI) measurement;
   identifying a pre-defined constant offset relative to a downlink timing;
   measuring, by applying the pre-defined constant offset, an SRS-reference signal received power (SRS-RSRP) for the CLI measurement based on the at least one SRS resource; and
   transmitting, to a serving base station (BS), a measurement report including information on the SRS-RSRP,
   wherein the method further comprises:
      identifying a resource configured for a received signal strength indication (RSSI);
      measuring the RSSI for the CLI measurement based on the resource; and
      transmitting, to the serving BS, information on the RSSI.

2. The method of claim 1, wherein a total number of the at least one SRS resource to be monitored does not exceed 32 and a number of SRS resources to be monitored does not exceed 8 within a slot.

3. The method of claim 1, wherein downlink (DL)-uplink (UL) configurations are exchanged over Xn interfaces between the serving BS and another BS to mitigate the CLI.

4. The method of claim 1, wherein the resource for the RSSI and at least one SRS resource do not overlap each other.

5. The method of claim 1, wherein the resource for the RSSI and the at least one SRS resource are located in different slots.

6. A method performed by a serving base station (BS) in a wireless communication system, the method comprising:
   transmitting, to a first terminal, a configuration of a sounding reference signal reference signal received power (SRS-RSRP) measurement for a cross link interference (CLI) measurement; and
   receiving, from the first terminal, a measurement report including information on an SRS-RSRP for the CLI measurement,
   wherein the SRS-RSRP is associated with at least one SRS resource of a second terminal,
   wherein the SRS-RSRP measurement is based on a pre-defined constant offset relative to a downlink timing, and
   wherein the method further comprises:
      transmitting, to the first terminal, a configuration of a received signal strength indication (RSSI) measurement for the CLI measurement; and
      receiving, from the first terminal, information on the RSSI, the RSSI being associated with a resource for the RSSI configured by the serving BS.

7. The method of claim 6, further comprising:
   exchanging, with another BS, downlink (DL)-uplink (UL) configurations over Xn interfaces to mitigate the CLI.

8. The method of claim 6, wherein a total number of the at least one SRS resource to be monitored does not exceed 32 and a number of SRS resources to be monitored does not exceed 8 within a slot.

9. A terminal in a wireless communication system, the terminal comprising:
   a transceiver configured to transmit and receive signals; and
   a controller operably coupled to the transceiver, the controller configured to:
      identify at least one sounding reference signal (SRS) resource of a second terminal for a cross link interference (CLI) measurement,
      identify a pre-defined constant offset relative to a downlink timing,
      measure, by applying the pre-defined constant offset, an SRS-reference signal received power (SRS-RSRP) for the CLI measurement based on the at least one SRS resource, and
      transmit, to a serving base station (BS), a measurement report including information on the SRS-RSRP,
   wherein the controller is further configured to:
      identify a resource configured for a received signal strength indication (RSSI),
      measure the RSSI for the CLI measurement based on the resource, and
      transmit, to the serving BS, information on the RSSI.

10. The terminal of claim 9, wherein a total number of the at least one SRS resource to be monitored does not exceed 32 and a number of SRS resources to be monitored does not exceed 8 within a slot.

11. The terminal of claim 9, wherein downlink (DL)-uplink (UL) configurations are exchanged over Xn interfaces between the serving BS and another BS to mitigate the CLI.

12. The terminal of claim 9, wherein the resource for the RSSI and at least one SRS resource do not overlap each other.

13. The terminal of claim 9, wherein the resource for the RSSI and the at least one SRS resource are located in different slots.

14. A serving base station (BS) in a wireless communication system, the BS comprising:
- a transceiver configured to transmit and receive signals; and
- a controller operably coupled to the transceiver, the controller configured to:
  - transmit, to a first terminal, a configuration of a sounding reference signal reference signal received power (SRS-RSRP) measurement for a cross link interference (CLI) measurement; and
  - receive, from the first terminal, a measurement report including information on an SRS-RSRP for the CLI measurement,
  - wherein the SRS-RSRP is associated with at least one SRS resource of a second terminal,
  - wherein the SRS-RSRP measurement is based on a predefined constant offset relative to a downlink timing, and
  - wherein the controller is further configured to:
    - transmit, to the first terminal, a configuration of a received signal strength indication (RSSI) measurement for the CLI measurement, and
    - receive, from the first terminal, information on the RSSI, the RSSI being associated with a resource for the RSSI configured by the serving BS.

15. The serving BS of claim 14, wherein the controller is further configured to:
- exchange, with another BS, downlink (DL)-uplink (UL) configurations over Xn interfaces to mitigate the CLI.

16. The serving BS of claim 14, a total number of the at least one SRS resource to be monitored does not exceed 32 and a number of SRS resources to be monitored does not exceed 8 within a slot.

* * * * *